United States Patent [19]

Meyer et al.

[11] Patent Number: 5,984,020
[45] Date of Patent: *Nov. 16, 1999

[54] POWER TOLL INCLUDING INERTIA RESPONSIVE ELEMENT

[75] Inventors: Gary D. Meyer, Waukesha; Richard H. Jungmann, Richfield, both of Wis.

[73] Assignee: Milwaukee Electric Tool Corporation, Brookfield, Wis.

[*] Notice: This patent is subject to a terminal disclaimer.

[21] Appl. No.: 09/003,204

[22] Filed: Jan. 6, 1998

Related U.S. Application Data

[63] Continuation-in-part of application No. 08/516,092, Aug. 17, 1995, Pat. No. 5,704,435.

[51] Int. Cl.⁶ .............................. H02P 7/00; B27B 17/02
[52] U.S. Cl. .............................. 173/2; 173/176; 173/217; 173/171; 30/381
[58] Field of Search ................... 173/2, 4, 176, 173/217, 171; 30/381, 382; 227/8

[56] References Cited

U.S. PATENT DOCUMENTS

| 4,359,107 | 11/1982 | Smith .................................... 173/179 |
| 4,402,138 | 9/1983 | Glockle et al. ........................... 30/382 |
| 4,909,419 | 3/1990 | Yamada et al. ............................ 227/9 |
| 5,125,160 | 6/1992 | Gassen .................................... 30/382 |
| 5,126,643 | 6/1992 | French .................................... 318/434 |
| 5,155,421 | 10/1992 | Hansson ................................. 318/434 |
| 5,201,373 | 4/1993 | Bioechle ................................. 173/109 |
| 5,294,874 | 3/1994 | Hessenberger et al. ................ 318/759 |
| 5,366,132 | 11/1994 | Simonelli ................................. 227/8 |
| 5,511,715 | 4/1996 | Critcher et al. .......................... 227/8 |

FOREIGN PATENT DOCUMENTS

| 0 150 669 A2 | 12/1984 | European Pat. Off. . |
| 0 345 655 A2 | 6/1989 | European Pat. Off. . |
| 0 771 619 A2 | 5/1997 | European Pat. Off. . |
| 1 055 086 | 4/1959 | Germany . |
| 3 707 052 A1 | 9/1988 | Germany . |
| 4 334 933 A1 | 4/1995 | Germany . |
| 4 344 817 A1 | 6/1995 | Germany . |
| 196 28 945 A1 | 5/1997 | Germany . |
| WO95/32514 | 11/1995 | WIPO . |

OTHER PUBLICATIONS

Murata Electronics North America, Inc., Technical Manual, Vibratory Gyroscope and Various Applications, Catalog No. T–14–A, 1995.
Analog Devices, +5g to ±50g, Low Noise, Low Power, Single/Dual Axis Accelerometers, Rev. O, 1996.
Precision Navigation, Inc., TCM2 Electronic Compass Sensor Module Data Sheet, Oct. 1, 1995.
AMP Incorporated, Preliminary, Accelerometer ACH–04–08, Catalog 65750, Aug. 1994, Rev. E.

*Primary Examiner*—Scott A. Smith
*Attorney, Agent, or Firm*—Michael Best & Friedrich LLP

[57] ABSTRACT

A power tool including an inertia responsive element. The power tool comprises a housing, a motor supported by the housing and adapted to be connected to a power source, an output element supported by the housing and selectively coupled to the motor, the motor imparting motion to the output element, and an inertia responsive element for disconnecting the output element from the power source if movement of the housing is greater than a predetermined threshold. In one embodiment, the power tool is a hand held power tool having a handle, and the inertia responsive element disconnects the output element from the power source should the handle move at a rate greater than a predetermined rate. In another embodiment, the power tool is a stationary power tool, such as a drill press. The housing of the stationary power tool includes a base for supporting the stationary power tool on the workpiece. The base is selectively connectable to the workpiece so that, when the base is connected to the workpiece, the housing is substantially stationary relative to the workpiece. The inertia responsive element disconnects the output element from the power source when the housing moves relative to the workpiece at a rate greater than a predetermined rate.

23 Claims, 4 Drawing Sheets

POWER TOLL INCLUDING INERTIA RESPONSIVE ELEMENT

This application is a continuation-in-part of application Ser. No. 08/516,092, filed Aug. 17, 1995, now U.S. Pat. No. 5,704,435.

BACKGROUND OF THE INVENTION

This invention relates to power tools and, more particularly, to an inertia responsive element for power tools.

Hand held power tools include a motor coupled by drive gears to an output element, such as a saw blade, a drill bit, disc or belt sander or the like. Should the blade of a saw bind in the workpiece, the tool tends to jerk or kick back toward the operator. Similarly, should a drill bit bind, the drill tends to twist about the axis of the bit. In either case, if the drive motor continues to operate or remains coupled to the output element, the operator could have difficulty controlling the power tool.

Prior art tools addressed this problem by employing torque limiting devices, such as clutches, which disconnected the drive motor from the output element when the torque exceeded some preset value.

Also, other power tools, such as stationary power tools, include a housing having a base, a motor supported by the housing and an output element, such as a drill bit, selectively coupled to the motor. In some stationary power tools, the base supports the stationary power tool on the workpiece and is selectively connected to the workpiece so that the housing is stationary relative to the workpiece. If the output element binds on the workpiece, the stationary power tool tends to jerk or kickback, and the base may separate from the workpiece causing the housing to move relative to the workpiece. If the motor continues to operate or remains coupled to the output element, the operator may have difficulty controlling the stationary power tool.

Prior art stationary power tools addressed this problem by including a sensor or switch in the base which detects the presence of the workpiece through mechanical pressure or similar forces. If the mechanical sensor does not detect the workpiece beneath the base, the motor will not operate.

SUMMARY OF THE INVENTION

One problem with the above-described conventional hand held power tools is that while the use of torque limiting devices serves to reduce the occurrences of tool kick-back or axial twisting, such torque limiting devices also limited the use of the tool in high torque applications in which the operator has sufficient control to prevent sudden movement of the tool.

It is a primary object of the invention to provide a new and improved hand held power tool.

A further object of the invention is to provide a hand held power tool which permits more operational flexibility.

Another object of the invention is to provide a hand held power tool in which kickback or rapid rotation of the tool resulting from a binding output element is minimized.

In general terms, the invention comprises a hand held power tool having an output element and a motor coupled to the output element for imparting motion thereto relative to a workpiece. The tool includes an inertia responsive means operative upon sudden acceleration of the tool or other movement of the tool at a rate greater than that intended by the operator to disable the output element. According to one embodiment of the invention, the inertia responsive means includes inertia responsive switch means operative upon sudden acceleration of the handle or housing of the tool to disconnect the motor from its power source. According to another embodiment of the invention, the inertia responsive means is operative to uncouple the output element from the motor and to dissipate its stored energy upon rapid acceleration of the tool. In accordance with a further embodiment, the inertia responsive means is operative upon sudden acceleration to disconnect the drive motor from the energy source and to effect the absorption of the motor's rotational energy.

In a specific embodiment of the invention, the hand held power tool is a power drill, wherein the inertia switch may be housed in the handle of the drill at a position spaced from the axis of rotation of the drill spindle. In the event the drill bit binds in a workpiece, the handle tends to move through an arc about the axis of rotation of the drill bit. Such movement of the drill handle will actuate the inertia switch. By positioning the inertia switch in the drill handle and in spaced relation from the axis of the spindle, the inertia switch can immediately sense any movement of the drill caused by binding of the drill bit in the workpiece. The invention also contemplates the use of a rotationally responsive inertia switch which would then be located on the rotational axis or in spaced relation from the rotational axis.

In another embodiment of the invention, the power tool comprises a circular saw wherein the inertia switch may be housed in the handle or body of the saw. The inertia switch is positioned such that in the event the saw blade binds in a workpiece and kicks back toward the operator, the inertia switch immediately senses such movement of the saw and terminates operation.

Another object of the invention is to provide an improved stationary power tool. In a conventional stationary power tool, such as a drill press which is mounted on a workpiece, one problem is that the stationary power tool is typically used in an environment in which contaminants or corrosive materials are present. As a result, the conventional sensor included in the prior art stationary power tool is subject to contamination and breakage. If this occurs, the prior art sensor may not effectively disable the drill motor if the drill press is not attached to the workpiece or, alternatively, may not allow the drill press to operate even if the drill press is secured to the workpiece.

Another problem with conventional stationary power tools is that the conventional sensors are difficult to mount and wire in the base of a stationary power tool. This increases the cost associated with manufacturing a stationary power tool.

The invention also provides a power tool, such as a stationary power tool, which alleviates the problems associated with prior art stationary power tools. The present invention provides a stationary power tool including an inertia responsive element for determining when the housing of the stationary power tool moves at a rate greater than a predetermined rate relative to the workpiece. In this manner, the inertia responsive element senses whether the base of the stationary power tool is disconnected from the workpiece. When this occurs, the inertia responsive element then provides an output signal to be used, for example, to disconnect the output element from the power source.

In one embodiment, the stationary power tool is a drill press and includes a housing having a base for supporting the tool on the workpiece, a motor supported by the housing and adapted to be connected to a power source, and an output element selectively coupled to the motor. The base is selectively connected to the workpiece so that the housing is stationary relative to the workpiece. The tool also includes the inertia responsive element for disconnecting the output element from the power source should the housing move relative to the workpiece at a rate greater than a predetermined rate.

Preferably, the inertia responsive element disconnects the motor from the power source upon rapid acceleration of the housing. Alternatively, the inertia responsive element disconnects the output element from the motor upon rapid acceleration of the housing. In either alternative embodiment, the inertia responsive element may operate to dissipate the rotational energy of the output element.

In one embodiment, the inertia responsive element is directionally responsive and is located in spaced relation from the rotational axis of the output element. In another embodiment, the inertia responsive element is rotationally responsive and is located along or in spaced relation from the rotational axis of the output element.

One advantage of the present invention is that the stationary power tool has more operational flexibility.

Another advantage of the present invention is that a stationary power tool is provided in which kickback or rapid rotation of the tool that results from a binding output element is reduced.

A further advantage of the present invention is that the inertia responsive element does not have to be wired into the base of the power tool adjacent the surface which contacts the workpiece so that the presence of the workpiece can be detected. Rather, the inertia responsive element can be mounted in any position to sense the movement of the tool relative to the workpiece. As a result, the inertia responsive element is more easily mounted and wired in the stationary power tool. The costs associated with manufacturing the stationary power tool are thus decreased.

Yet another advantage of the present invention is that the stationary power tool is not prevented from operating in high torque applications in which the operator has sufficient control to prevent sudden movement of the stationary power tool relative to the workpiece.

Other features and advantages of the invention will become apparent to those skilled in the art upon review of the following detailed description, claims and drawings.

Figure 1:
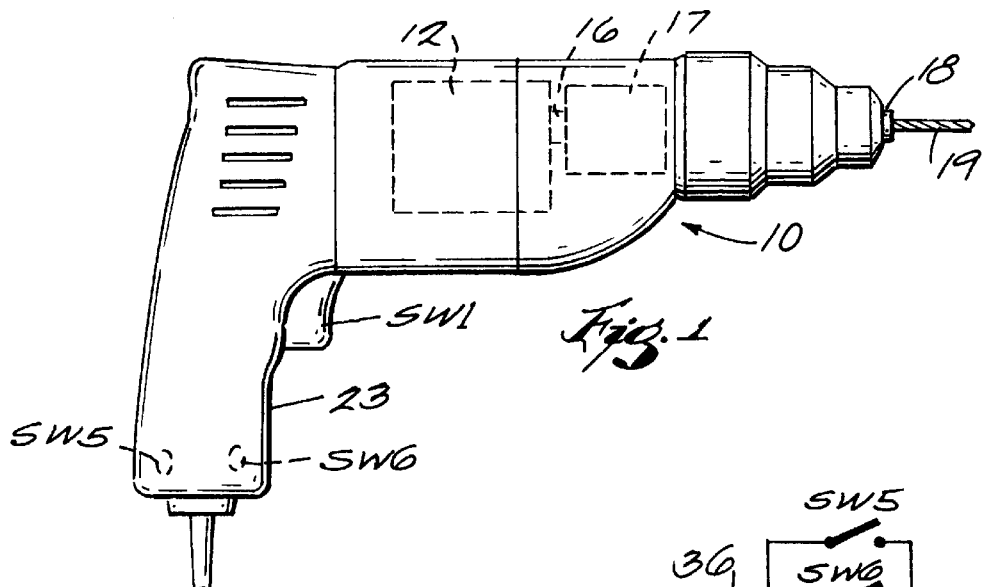
FIG. 1 shows a first embodiment of the invention comprising an electric hand drill having an inertia switch.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE INVENTION

FIG. 1 illustrates a hand held power tool 10 embodying the invention and which in the illustrated example is a drill. However, it will be appreciated by those skilled in the art that the invention has application to other power tools, such as saws, belt sanders, disc sanders and the like.

Figure 2:
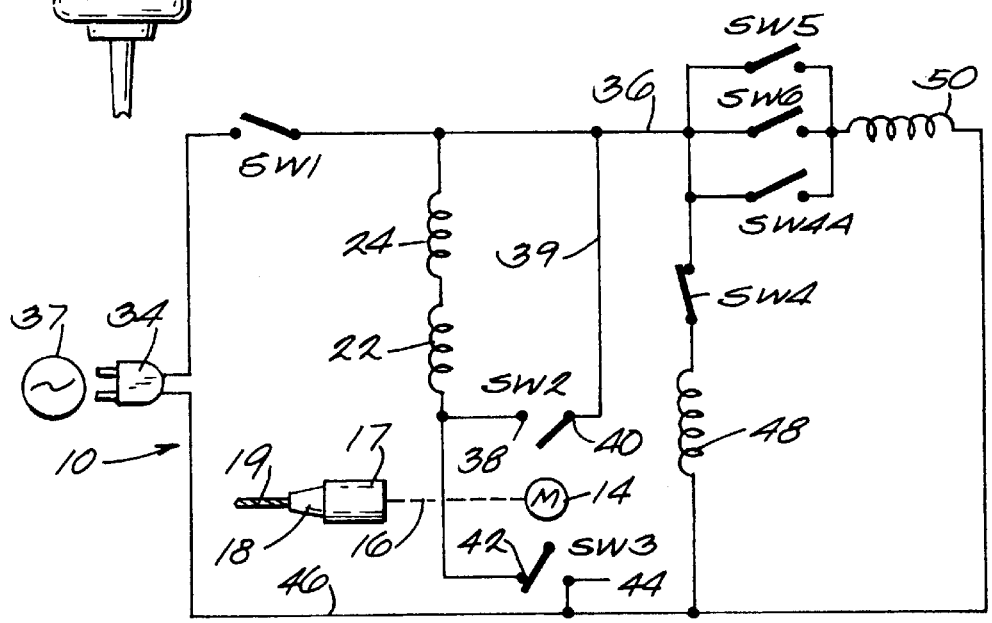
FIG. 2 schematically illustrates the hand held tool illustrated in FIG. 1.

The power tool 10 is shown in FIG. 2 to include a conventional electric motor 12 which will not be described in detail for the sake of brevity. It will be sufficient for purposes of understanding the invention to state that the motor 12 includes a rotatably mounted armature or rotor 14 having an output shaft 16 coupled in a conventional manner such as through a gear train 17 to an output element, such as drill spindle 18 supporting a drill bit 19. Those skilled in the art will appreciate that the armature 14 includes windings (not shown) for generating an armature field. Electrical energy is transferred to the rotating armature through commutator brushes (not shown). The motor 12 may also include a pair of run windings 22 and 24 for generating a magnetic field for rotating the armature 14. In the illustrated embodiment, the run windings 22 and 24 are connected in series and are preferably electrically identical and oriented on the opposite sides of the armature 14 to provide a magnetic field which is evenly distributed. The tool also includes a handle 23 and an on/off switch SW1. The run windings 22 and 24 are coupled to one side of a plug 34 through an on/off switch SW1 and a conductor 36. The plug 34 is adapted to be connected to an electrical power source 37. The other side of the run windings 22 and 24 are connected to switches SW2 and SW3. Switch SW2 includes a first contact 38 connected to the run windings 22 and 24 and a second contact 40 by conductor 39 connected to conductor 36. Switch SW3 also has a first contact 42 connected to windings 22, 24 and a second contact 44 connected to a return conductor 46. The armature 14 is connected between switches SW2 and SW3.

A relay is mechanically connected to switches SW2 and SW3 and includes a coil 48 connected in series with a normally closed switch SW4 between conductors 36 and 46. A second relay coil 50 is mechanically coupled to switch SW4 and is connected between conductors 36 and 46 through the parallel combination of oppositely oriented uni-directional inertia switches SW5 and SW6 which are normally open. Switch SW4A is a latching contact for second relay coil 50 as long as switch SW1 is closed.

When relay coil 48 is de-energized, switch SW2 is on contact 40 and switch SW3 is on contact 42 as shown in FIG. 2. In addition, switch SW4 is normally closed and switches SW5 and SW6 and SW4A are normally open. When manual switch SW1 is closed, relay coil 48 is energized to move switch SW2 to contact 38 and switch SW3 to contact 44. This energizes the run windings 22 and 24 and the rotor 14. The tool 10 then operates in the normal manner.

Should the drill bit 19 bind causing rapid rotational movement of the tool 10, one of the inertia switches SW5 or SW6 will operate, depending upon the direction of rotation. In either event, this energizes relay coil 50 which opens switch SW4 thereby de-energizing the relay coil 48 and closes latching switch SW4A which keeps relay coil 50 energized even after SW5 or SW6 open. This moves switch SW2 to contact 40 and switch SW3 to contact 42 thereby disconnecting the run windings 22, 24, and the rotor 14 from the power source 37. In addition, the run windings 22 and 24 are connected in a closed loop with the rotor 14 so that the rotational energy of the rotor 14 generates a counter EMF across the windings 22 and 24 thereby producing a dynamic braking effect. In this manner, the rotational energy is quickly dissipated as heat. Relay coil 50 will remain in its latched state until on/off SW1 is opened disconnecting relay coil 50 from the power source 37. Relay coil 50 becomes de-energized which opens SW4A thereby relay coil 50 returns to an unlatched state.

FIG. 2 shows a pair of uni-directional inertia switches SW5 and SW6. While any suitable switches may be employed, in the preferred embodiment, Aerodyne Model No. 7832-1-000 switches are employed. These switches momentarily make contact and then reopen when acceleration ceases. Alternately, a single bi-directional or rotational inertia switch may be substituted for the uni-directional switches SW5 and SW6.

Figure 5:
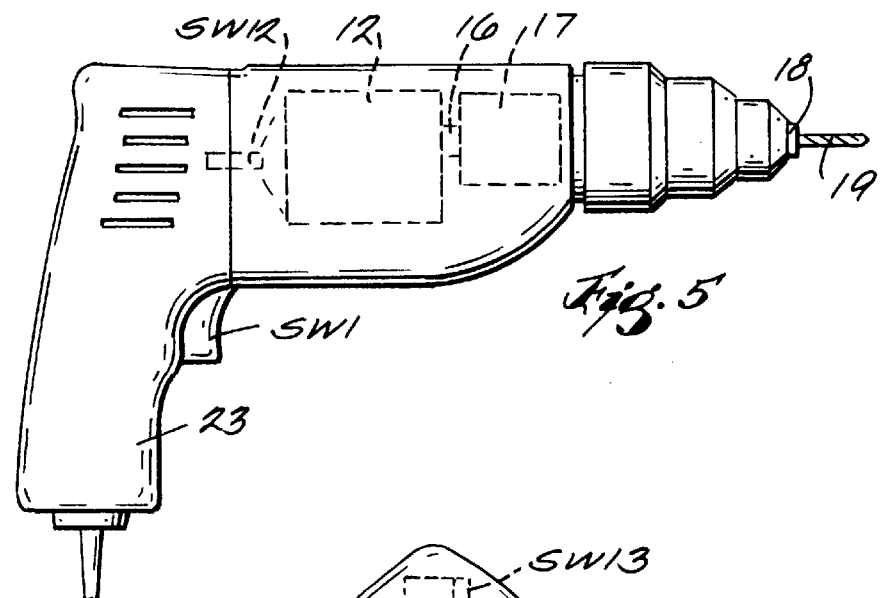
FIG. 5 shows another alternative embodiment of the invention.

The uni-directional inertia switches SW5 and SW6 are positioned in the handle 23 so that they are spaced from the rotational axis of the drill bit 19 as shown in FIG. 1 to insure sufficient linear acceleration to effect operation. A bi-directional inertia switch would be similarly positioned in the handle 23 while a rotational inertia switch SW12 could be positioned at the rotational axis of drill bit 19 or in the handle 25 (as shown in FIG. 5).

While electromagnetic relays 48 and 50 are shown for operating switches SW2, SW3, SW4 and SW4A, it will be appreciated that this function can also be performed by electronic switches as well. Thus, the term switching means as used in the appended claims is intended to mean any well known type of switching device or element.

Figure 3:
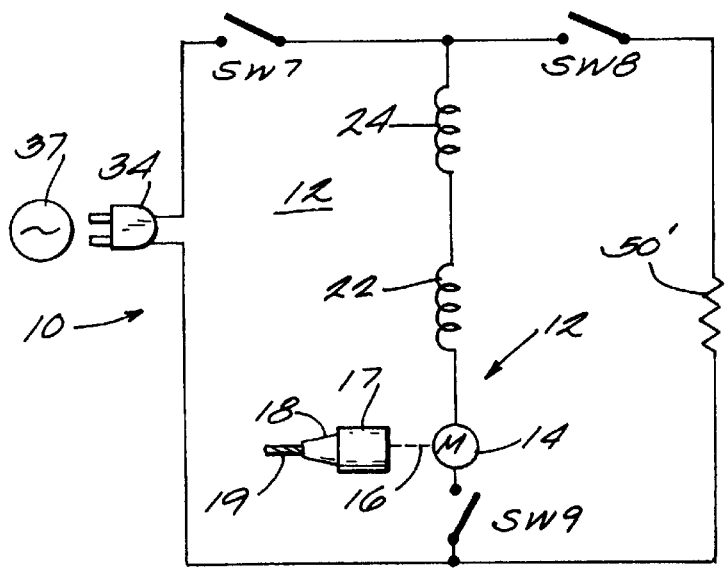
FIG. 3 schematically illustrates an alternative embodiment of the invention.

FIG. 3 shows an alternate embodiment of the invention to include switches SW7 and SW9 connected in series between a power source 37 and the run windings 22 and 24 and the armature 14. Switch SW7 is an on/off switch for manually connecting the motor 12 to the power source 37. A normally open inertia responsive switch SW8 is connected in series with relay coil 50 in parallel with the motor 12. Switch SW8 is operable to close upon rapid acceleration to energize coil 50 which opens normally closed contacts SW9 in series with motor 12.

Operation of the tool 10 is initiated by closing the on/off switch SW7. This energizes the run windings 22 and 24 and the armature windings (not shown) causing the armature to rotate thereby driving the drill bit 19 in a conventional manner. Should the drill bit 19 bind, the handle 23 of tool 10 may be caused to jerk or rotate about the axis of the drill bit. This rapid acceleration of the handle 23 closes switch SW8 to energize coil 50 which opens switch SW9, thereby disconnecting the motor 12 from the power source 37 and disabling the tool 10 until the switch SW9 is reset.

Figure 4:
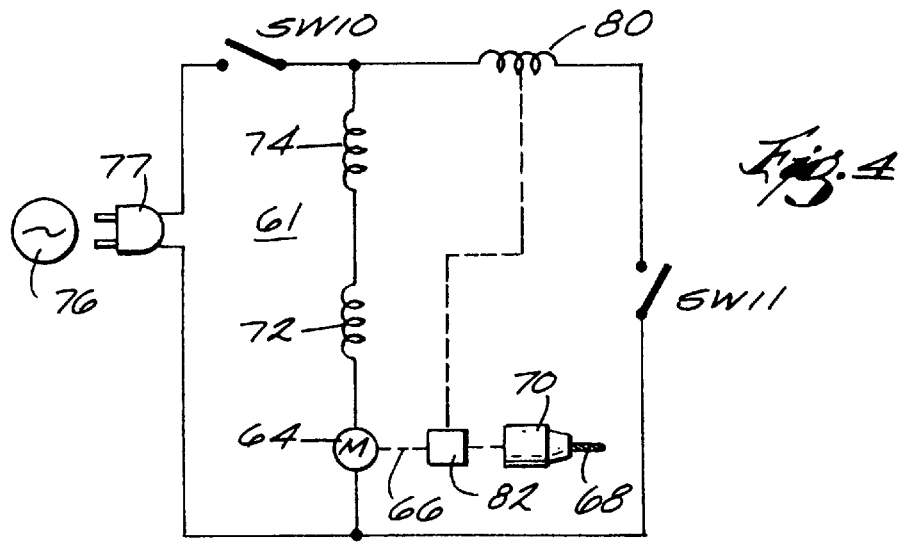
FIG. 4 schematically illustrates a further embodiment of the invention.

FIG. 4 shows schematically another alternative embodiment of the invention and including a hand held power tool which includes a motor 61 having a rotor 64 connected by an output shaft 66 to an output element, such as a drill bit 68, through a gear train 70. The motor 61 also includes run windings 72 and 74 connected in series with each other and with rotor 64 and the series combination connected to a power source 76 through an on/off switch SW10 and a plug 77. The coil of relay 80 is connected in series with a normally open inertia switch SW11 and the series combination is connected across the motor 61. The relay 80 is mechanically connected to coupling means such as a clutch 82 disposed between the motor shaft 66 and the gear train 70.

Operation of the motor 61 is initiated by closing on/off switch SW10 which energizes the rotor 64 and the run windings 72 and 74. Should the drill bit 68 bind in the workpiece, whereby the tool is rapidly accelerated about the axis of tool bit 68, the inertia switch SW11 is caused to close. This energizes relay 80 which actuates clutch 82 to disconnect the drill bit 68 from the shaft 66. After the drill bit 68 has been released, switch SW11 can be reset to its open position thereby de-energizing the coil of relay 80 so that clutch 82 recouples gear train 70 to shaft 66. While in the embodiment of FIG. 4, the switch SW11 is indicated as being a latching type which must be reset, it is also contemplated that this switch may be the type which closes momentarily. In the latter event, the clutch 82 will be of the latching type which can be reset manually or electrically.

While in each of the embodiments referred to above a drill is shown as an example, it will be appreciated by those skilled in the art that each of the embodiments shown schematically in FIGS. 2–4 can be employed with any type of tool which is likely to jerk, kick back, or spin should they bind in the workpiece.

FIG. 5 shows a drill similar to that of FIG. 1 except that the inertia responsive means is a rotationally responsive inertia switch SW12 located on the rotational axis of bit 19. Switch SW12 would replace the switches SW5 and SW6 of FIG. 2, the switch SW8 of FIG. 3 or SW11 of FIG. 4.

Figure 6:
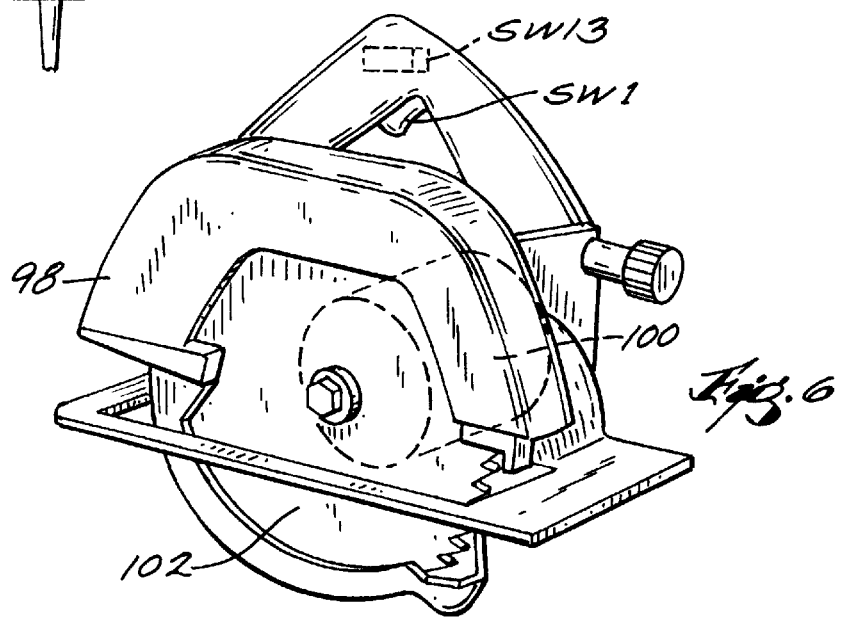
FIG. 6 shows another alternative embodiment of the invention including an electric circular saw having an inertia switch.

FIG. 6 illustrates another embodiment of the invention and wherein a circular saw 98 includes an inertia switch SW13. The circular saw includes a motor 100 drivingly connected to circular saw blade 102. During operation of the circular saw 98, if the blade encounters an obstruction or binds, the saw 98 will tend to jerk rearwardly with respect to the direction of cutting. The inertia switch SW13 is positioned such that if the saw jerks rearwardly, the inertia switch SW13 is caused to close. Switch SW13 would replace the switches SW5 and SW6 of FIG. 2, the switch SW8 of FIG. 3 or SW11 of FIG. 4.

While in the illustrated arrangement the inertia responsive means includes an inertia switch which is responsive to acceleration of the tool, other arrangements could be employed with electronics responsive to data indicating excessive velocity of the tool or position changes of the tool. It should be understood that an inertia responsive element, as described below, can be substituted for the inertia switches described above.

One of the primary advantages of the invention is that the inertia switch interrupts operation of the electric hand tool only if the operator loses control. The ability to control a hand tool depends on the skill and strength of the operator. A hand tool embodying the invention can accommodate any operator because operation of the tool is interrupted only if the tool jerks or spins sufficiently that the operator loses control.

Another advantage of the invention is that the effectiveness of the mechanism for interrupting operation of the hand tool can be easily tested by the operator. With the hand tool running, the operator can quickly move or jerk the handle of the tool to ensure interruption of operation of the tool.

Figure 7:
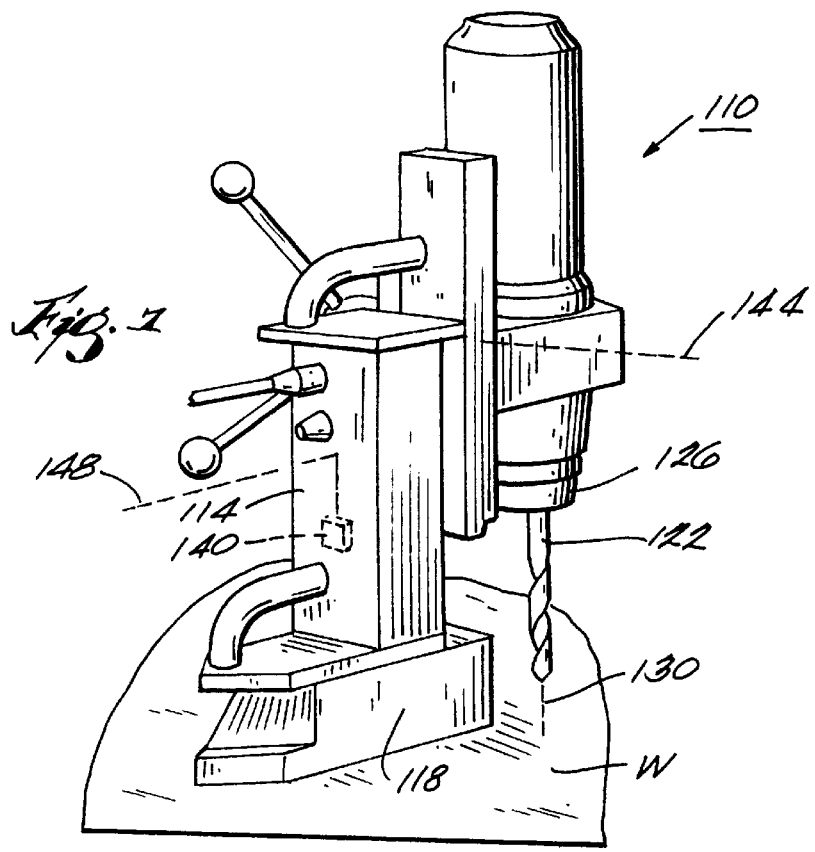
FIG. 7 is a perspective view of a stationary power tool which is another embodiment of the invention.
Figure 8:
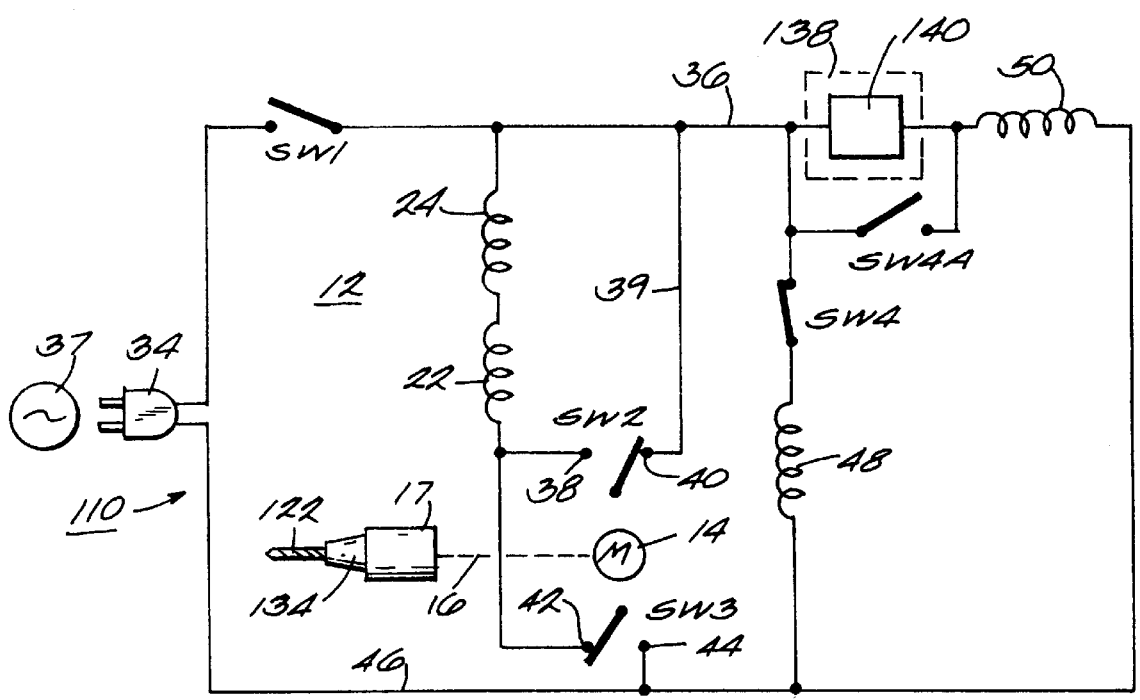
FIG. 8 schematically illustrates the stationary power tool illustrated in FIG. 7.

A power tool 110, such as a stationary power tool, is another alternative embodiment of the invention and is illustrated in FIGS. 7–8. Except as otherwise described, the stationary power tool 110 is identical to the hand-held power tool 10 illustrated in FIG. 2 and will not be described in detail. Like elements are identified using like reference numbers.

As shown in FIG. 7, the stationary power tool 110 is a drill press. In other constructions (not shown), the stationary power tool 110 may be any type of power tool which is selectively connected to a workpiece W or a work bench (not shown) so that the power tool is substantially stationary relative to the workpiece W or the work bench.

The stationary power tool 110 includes a housing 114 having a base 118 for supporting the stationary power tool 110 on a workpiece W. The base 118 is selectively connectable to the workpiece W so that the housing 114 is substantially stationary relative to the workpiece W. The base 118 includes a force applying element (not shown) for applying a force to the workpiece W and connect the base 118 to the workpiece W.

In the illustrated construction, the force applying element is an electromagnet (not shown) mounted in the base 118 and selectively securing the stationary power tool 110 to the ferro-magnetic workpiece W. The electromagnetic element may be any known in the art and, therefore, will not be described in detail.

In other constructions (not shown), the force applying element may be a permanent magnet for securing the stationary power tool 110 to a ferro-magnetic workpiece W. In yet other constructions (not shown), the force applying element may be a vacuum pad or a clamp mechanism for securing the stationary power tool 110 to any type of workpiece.

The stationary power tool 110 also includes an output element 122 rotatably supported by the housing 114 in a tool holder or chuck 126. The output element 122 defines an axis of rotation 130. The tool holder 126 is mounted on a spindle 134 and imparts motion of the spindle 134 to the output element 122.

In the illustrated construction, the output element 122 is a drill bit for the drill press. In other constructions (not shown), the output element 122 is the tool element required for the stationary power tool 110 of the alternate construction.

The stationary power tool 110 also includes (see FIG. 8) the conventional motor 12 supported by the housing 114. The motor 12 is operable to be connected to and to rotatably drive the output element 122. Further, the motor 12 is adapted to be connected to the power source 37. In the illustrated construction, the power source 37 is a conventional electric power source. Therefore, the motor 12 and the power source 37 will not be described in detail. In other constructions (not shown), the stationary power tool 110 may include a battery power source.

The stationary power tool 110 also includes an electrical circuit 138 (partially schematically illustrated in FIG. 8) including, among other things, an inertia responsive element 140 (schematically illustrated) for disconnecting the output element 122 from the power source 37 in response to movement of the housing 114 above a predetermined threshold. In the motor 12, the electrical circuit 138, including the inertia responsive element 140, is electrically connected in a manner similar to the connection of the inertia responsive switches SW5 and SW6 described above. The second relay coil 50 is mechanically coupled to the switch SW4 and is connected between the conductors 36 and 46 through the electrical circuit 138 and through the inertia responsive element 140.

In operation, the base 118 of the stationary power tool 110 is attached to the surface of the workpiece W, as known in the art. In the illustrated construction, the base 118 is attached by energizing the electromagnet. The on/off switch SW1 is closed causing the motor 12 to drive the output element 122. If the output element 122 binds on the workpiece W, the base 118 may separate from the workpiece W, and the stationary power tool 110 may then move relative to the workpiece W about the axis 130. Movement of the stationary power tool 110 relative to the workpiece W above a predetermined threshold causes the electrical circuit 138 to produce an output signal in response to a signal from the inertia responsive element 140 indicating that the movement is above the threshold.

The output signal of the electrical circuit 138 energizes the relay coil 50 which opens the switch SW4. The relay coil 48 is de-energized and closes the latching switch SW4A. The closed latching switch SW4A keeps the relay coil 50 energized even after the electrical circuit 138 and the inertia responsive element 140 cease to produce the output signal. The switch Sw2 is moved to contact 40, and the switch Sw3 is moved to contact 42. The run windings 22 and 24 and the rotor 14 are thus disconnected from the power source 37.

In addition, the run windings 22 and 24 are connected in a closed loop with the armature 14 so that the rotational energy of the armature 14 generates a counter-EMF across the run windings 22 and 24. This connection produces a dynamic braking effect. The rotational energy of the armature 14 is thus quickly dissipated as heat. As described above, the relay coil 50 will remain in its energized and latched state until the on/off switch SW1 is opened.

Figure 9:
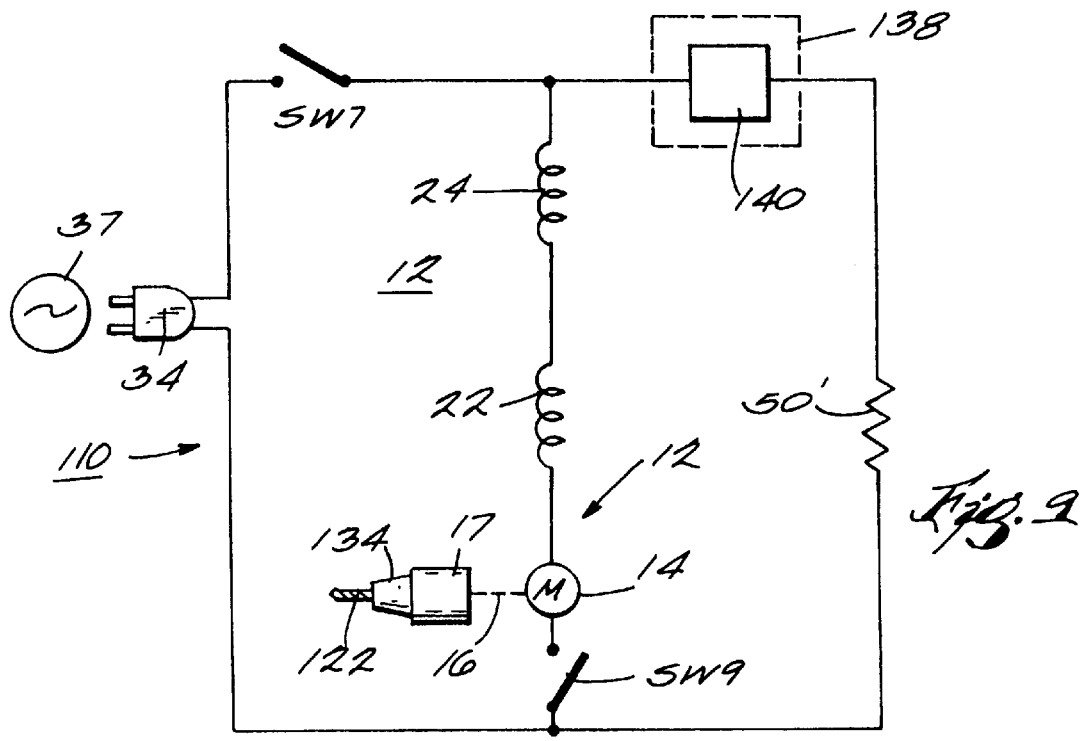
FIG. 9 schematically illustrates an alternative embodiment of the invention shown in FIG. 7.

FIG. 9 schematically illustrates another alternative embodiment of the stationary power tool 110. Except as otherwise described, the stationary power tool 110 is identical to the hand-held power tool 10 illustrated in FIG. 3 and will not be described in detail. Like elements are identified using like reference numbers.

In the construction shown in FIG. 9, the electrical circuit 138, including the inertia responsive element 140, is connected in series with the relay coil 50 and in parallel with the motor 12. If the output element 122 binds on the workpiece W, movement of the stationary power tool 110 above a predetermined threshold causes the inertia responsive element 140 to produce the signal indicating that the movement is above the threshold. The signal from the inertia responsive element 140 causes the electrical circuit 138 to produce the output signal, energizing the coil 50. The energized coil 50 opens the normally closed switch SW9 and thus disconnects the motor 12 from the power source 37. As a result, the stationary power tool 110 is disabled until the switch Sw9 is reset by opening the on/off switch SW7.

Figure 10:
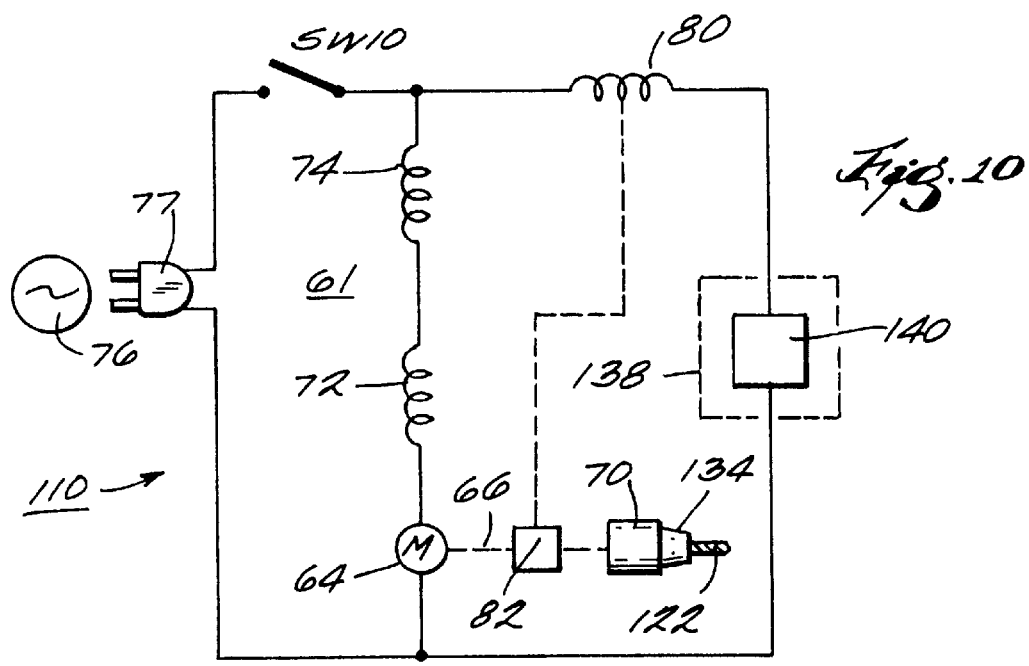
FIG. 10 schematically illustrates a further embodiment of the invention shown in FIG. 7.

FIG. 10 schematically illustrates another alternative embodiment of the stationary power tool 110. Except as otherwise described, the stationary power tool 110 is identical to the hand-held power tool 10 illustrated in FIG. 4 and will not be described in detail. Like elements are identified using like reference numbers.

As shown in FIG. 10, the relay coil 80 is connected in series with the electrical circuit 138, including the inertia responsive element 140, and the series combination is connected across the motor 61. The relay coil 80 is mechanically connected to the clutch 82 positioned between the motor shaft 66 and the gear train 70. If the output element 122 binds on the workpiece W, movement of the stationary power tool 110 above a predetermined threshold causes the inertia responsive element 140 to produce the signal indicating that the movement is above the threshold. The signal from the inertia responsive element 140 causes the electrical circuit 138 to produce the output signal, energizing the relay coil 80. The energized relay coil 80 actuates the clutch 82, disconnecting the output element 122 from the shaft 66.

As described above, the inertia responsive element 140 can be reset so that it does not produce the signal indicating that the movement is above the threshold. Once the inertia responsive element 140 is reset, the relay coil 80 is de-energized so that the clutch 82 recouples the gear train 70 to the shaft 66. In other constructions (not shown), rather than resetting the inertia responsive element 140, the clutch 82 may be a latching type which must be reset manually or electrically.

The inertia responsive element 140 may be an inertia switch, such as the inertia switches SW5, SW6, SW8 and SW11, described above. Such inertia switches are digital or discrete types of sensors. A digital sensor has two states or positions, i.e., either on or off. For example, the inertia switches SW5, SW6, SW8 and SW11 each have a contact which is open in the normal state and which closes upon movement of the switch (and the associated tool) at a rate greater than a predetermined rate, or above a predetermined threshold for the switch. When this occurs, the digital sensor produces the output signal of the electrical circuit 138 to be used, for example, to disconnect the output element 19 from the power source 37, as described above.

In the preferred embodiment, however, the inertia responsive element 140 is an accelerometer. The accelerometer may be an Analog Devices model ADXL150 or ADXL250 capacitive accelerometer or a Humphrey, Inc. model LA01 or LA02 resistance temperature detector (RTD) accelerometer. It should be understood that other types of accelerometers, such as non-capacitive accelerometers, could also be used.

An accelerometer is an analog or continuous output type of sensor. Such an analog sensor continuously monitors the positional state of the associated tool and continuously produces a signal corresponding to the position of the tool. If the signal from the analog sensor is above a predetermined threshold, the electrical circuit 138 produces the output signal which is used, for example, to disconnect the output element 122 from the power source 37.

In such a construction with an analog sensor as the inertia responsive element 140, the electrical circuit 138 includes an element, such as a micro-computer, or additional elements to convert the signal from the analog sensor to the output signal of the electrical circuit 138. For example, the electrical circuit 138 may include a power supply (not shown) for energizing and powering the analog sensor. Also, the electrical circuit 138 may include a conditioning circuit (not shown) for, among other things, filtering the signal from the analog sensor to produce a usable signal. In addition, the electrical circuit 138 may include a threshold determining circuit (not shown) for comparing the signal from the analog sensor with the predetermined threshold to determine whether the signal and, correspondingly, the movement of the stationary power tool 110 is above the predetermined threshold. Further, the electrical circuit 138 may include a relay driver circuit (not shown) for producing the output signal to energize the relay coil 50 or 80.

In other constructions, digital sensors and analog sensors may be used in combination. In such combinations, the digital sensor produces the output signal if, for a single, discrete measurement, the movement of the tool is greater than the predetermined threshold for the digital sensor. The portion of the electrical circuit 138 including the analog sensor produces the usable output signal if, for a given period of time, the total movement of the tool is greater than the predetermined threshold for signal of the analog sensor.

The electrical circuit 138 and the inertia responsive element 140 can be designed to respond to one or more of several measurements of the positional state of the stationary power tool 110 to determine whether the movement of the stationary power tool 110 is above the predetermined threshold. For example, the electrical circuit 138 and the inertia responsive element 140 can be designed to sense the relative position of the stationary power tool 110 and the workpiece W. Further, the electrical circuit 138 and the inertia responsive element 140 can also be designed to sense the change in position, i.e. the velocity, of the stationary power tool 110, the change in velocity, i.e. the acceleration, of the stationary power tool 110, and/or the change in acceleration, i.e. the jerk, of the stationary power tool 110. In the preferred embodiment, the electrical circuit 138 and the inertia responsive element 140 respond to both the position of and the acceleration of the stationary power tool 110.

The inertia responsive element 140 can be positioned in the housing 114 of the stationary power tool 110 to sense movement of the stationary power tool 110 in numerous directions. For example, in the construction shown in FIG. 7, the inertia responsive element 140 is positioned off the axis 130 and responds to movement of the stationary power tool 110 about the axis 130 in either direction, clockwise or counterclockwise. In other constructions (not shown), the inertia responsive element 140 can be located along the axis 130 and also respond to movement of the stationary power tool 110 about the axis 130.

The inertia responsive element 140 can also be designed and positioned to respond to movement of the stationary power tool 110 about a forward tilt axis 144. In such constructions (not shown), the inertia responsive element 140 can be positioned on or off the axis 144 and responds to forward or rearward tilting movement of the stationary power tool 110 about the axis 144.

Further, the inertia responsive element 140 can be designed and positioned to respond to movement of the stationary power tool 110 about a side tilt axis 148. In such constructions (not shown), the inertia responsive element 140 can be positioned on or off the axis 148 and responds to tilting movement of the stationary power tool 110 to either side about the axis 148.

In other constructions (not shown), the stationary power tool 110 may include a single inertia responsive element 140 capable of responding to movement about more than one of the axes 130, 144 and 148. Further, the stationary power tool 110 may include a plurality of separate inertia responsive elements 140. Each inertia responsive element 140 would be positioned relative to one of the axes 130, 144 and 148 to respond to movement of the stationary power tool 110 about the corresponding axis 130, 144 or 148.

Various features of the invention are set forth in the following claims.

We claim:

1. A power tool comprising:
   a housing;
   a motor supported by said housing and adapted to be connected to a power source;
   an output element supported by said housing and selectively coupled to said motor such that said motor imparting motion to said output element; and an inertia responsive element for disconnecting said output element from the power source if movement of said housing relative to the workpiece is greater than a predetermined threshold.

2. The tool set forth in claim 1 wherein said housing includes a base for supporting said tool on the workpiece, said base being selectively connectable to the workpiece so that, when said base is connected to the workpiece, said housing is substantially stationary relative to the workpiece, and wherein said inertia responsive element disconnects said output element from the power source if movement of said housing relative to the workpiece is greater than the predetermined threshold.

3. The tool set forth in claim 2 wherein said inertia responsive element disconnects said motor from the power source upon acceleration of said housing greater than the predetermined threshold.

4. The tool set forth in claim 3 wherein said inertia responsive element is an accelerometer, and wherein said accelerometer electrically disconnects said motor from the power source upon acceleration of said housing greater than the predetermined threshold.

5. The tool set forth in claim 2 wherein said motor includes a rotor coupled to said output element and a clutch for disconnecting said output element from said rotor, and wherein said inertia responsive element is coupled to said clutch and actuates said clutch to disconnect said output element from said rotor upon acceleration of said housing greater than the predetermined threshold.

6. The tool set forth in claim 2 wherein said motor includes a rotor and coupling means for connecting and disconnecting said output element from said rotor, and wherein said inertia responsive element is coupled to said coupling means and actuates said coupling means to uncouple said rotor from said output element upon acceleration of said housing greater than the predetermined threshold.

7. The tool set forth in claim 2 wherein said motor includes winding means, a rotor, and switching means having a first position for connecting said winding means and said rotor to the power source, said switching means also having a second position for disconnecting said winding means and said rotor from the power source.

8. The tool set forth in claim 7 wherein, in said second position, said switching means reconnects said rotor to said winding means in a continuous circuit to generate an electromotive force that stops rotation of said rotor.

9. The tool set forth in claim 7 wherein said motor is operable to impart rotational movement on said rotor, and wherein said switching means, when in said second position, connects said rotor to said winding means in a closed loop for dissipating the rotational energy of said rotor.

10. The tool set forth in claim 9 and further comprising switch operating means for operating said switching means between said first and second positions, and wherein said inertia responsive element actuates said switch operating means to move said switching means from said first to said second position upon rapid acceleration of said housing.

11. The tool set forth in claim 2 wherein said output element has a rotational axis, and wherein said inertia responsive element is directionally responsive and is located in spaced relation from said rotational axis.

12. The tool set forth in claim 1 wherein said inertia responsive element is an accelerometer.

13. A power tool comprising:
a housing including a base for supporting said tool on the workpiece, said base being selectively connectable to a workpiece so that, when said base is connected to the workpiece, said housing is substantially stationary relative to the workpiece;
an output element supported by said housing;
a motor adapted to be connected to a power source such that said motor, when operated, connects said output element to the power source to impart rotational movement to said output element; and
an inertia responsive element operable to disconnect said output element from the power source if movement of said housing relative to the workpiece is greater than a predetermined threshold.

14. The power tool set forth in claim 13 wherein said inertia responsive element disconnects said output element from the power source by disconnecting said motor from the power source.

15. The power tool set forth in claim 14 wherein said power tool is an electric power tool and the power source is an electrical power source, wherein said motor is an electric motor and includes a winding connected to the electrical power source, and wherein said inertia responsive element disconnects said winding from the electrical power source if movement of said housing relative to the workpiece is greater than the predetermined threshold.

16. The power tool set forth in claim 13 further comprising a clutch selectively coupling said motor to said output element, wherein said inertia responsive element disconnects said output element from the power source by actuating said clutch to uncouple said motor from said output element.

17. The power tool set forth in claim 13 wherein said motor includes a rotor, and wherein said inertia responsive element dissipates the rotational energy of said rotor if movement of said housing relative to the workpiece is greater than a predetermined threshold.

18. The power tool set forth in claim 17 wherein said motor is an electric motor and includes a winding connected in series with said rotor, and wherein said inertia responsive element selectively connects said winding and said rotor in a continuous circuit to dissipate the rotational energy of said rotor and generate an electromotive force to resist the rotation of said rotor.

19. The electric power tool set forth in claim 17 further comprising a clutch selectively coupling said rotor to said output element such that said clutch uncouples said rotor from said output element to dissipate the rotational energy of said rotor if movement of said housing relative to the workpiece is greater than a predetermined threshold.

20. The electric power tool set forth in claim 13 wherein said inertia responsive element is an accelerometer.

21. An electric power tool comprising:
a housing including a base for supporting said tool on a workpiece, said base being selectively connectable to the workpiece so that, when said base is connected to the workpiece, said housing is substantially stationary relative to the workpiece;
an output element supported by said housing;
an electric motor adapted to be connected to an electrical power source such that said motor, when energized, connects said output element to the electrical power source to impart rotational movement on said output element, said motor including a winding and a rotor connected in series and adapted to be connected in series to the electrical power source, said rotor selectively coupled to said output element; and
an inertia responsive element for disconnecting said output element from the electrical power source if movement of said housing relative to the workpiece is greater than a predetermined threshold, said inertia responsive element disconnecting said output element from the electrical power source by a one of either disconnecting said winding and said rotor from the electrical power source or disconnecting said output element from said rotor.

22. The electric power tool set forth in claim 21 wherein said inertia responsive element disconnects said output element from the electrical power source by disconnecting said motor from the electrical power source, wherein said motor further includes a switch connected in series with said winding and said rotor, said switch having a first position connecting said winding and said rotor to the electrical power source and a second position disconnecting said winding and said rotor from the electrical power source, and wherein said inertia responsive element actuates said switch from said first position to said second position if movement of said housing relative to the workpiece is greater than a predetermined threshold.

23. The electric power tool set forth in claim 21 and further comprising a clutch operable to uncouple said rotor from said output element, and wherein said inertia responsive element disconnects said output element from the electrical power source by disconnecting said output element from said rotor, and wherein said inertia responsive element actuates said clutch to uncouple said rotor from said output element if movement of said housing relative to the workpiece is greater than a predetermined threshold.

* * * * *